United States Patent [19]
Ang

[11] Patent Number: 5,870,614
[45] Date of Patent: Feb. 9, 1999

[54] THERMOSTAT CONTROLS DSP'S TEMPERATURE BY EFFECTUATING THE DSP SWITCHING BETWEEN TASKS OF DIFFERENT COMPUTE-INTENSITY

[75] Inventor: Michael Anthony Ang, Santa Clara, Calif.

[73] Assignee: Philips Electronics North America Corporation, New York, N.Y.

[21] Appl. No.: 784,643

[22] Filed: Jan. 21, 1997

Related U.S. Application Data

[60] Provisional application No. 60/027,097 Sep. 25, 1996.

[51] Int. Cl.$^6$ .................................................. G06F 11/30
[52] U.S. Cl. ................. 395/750.03; 364/557; 395/672
[58] Field of Search .......................... 364/557; 395/675, 395/677, 750.03, 750.05, 672

[56] References Cited

U.S. PATENT DOCUMENTS

| | | | |
|---|---|---|---|
| 5,451,892 | 9/1995 | Bailey | 327/113 |
| 5,485,127 | 1/1996 | Bertoluzzi et al. | 331/69 |
| 5,490,059 | 2/1996 | Mahalingaiah et al. | 364/166 |
| 5,664,201 | 9/1997 | Ikedea | 395/750.03 |
| 5,713,030 | 1/1998 | Euoy | 395/750.04 |
| 5,719,800 | 2/1998 | Mittal et al. | 364/707 |
| 5,721,837 | 2/1998 | Kikinis et al. | 395/281 |
| 5,723,998 | 3/1998 | Saito et al. | 327/513 |

FOREIGN PATENT DOCUMENTS

| | | | |
|---|---|---|---|
| 0592783 | 4/1994 | European Pat. Off. | |
| 0651314 | 5/1995 | European Pat. Off. | |
| 0730217 | 9/1996 | European Pat. Off. | |
| 9210032 | 6/1992 | WIPO | |
| WO9210032 | 11/1992 | WIPO | H03K 17/08 |
| WO9525296 | 9/1995 | WIPO | G06F 1/20 |

OTHER PUBLICATIONS

"Encyclopedia of Graphics File Formats", by James D. Murray et al, pp. 458–464.

"Structured Computer Organization", 3rd. ed., by Andrew S. Tanenbaum, pp. 307–312.

"High–Performance Computer Architecture", by Harold S. Stone, p. 405.

*Primary Examiner*—Kenneth S. Kim
*Attorney, Agent, or Firm*—Peter Verdonk

[57] ABSTRACT

A data processor chip has a sensor that senses the temperature of the substrate. When the sensor senses that the temperature has increased beyond a predetermined level, the sensor supplies a signal to the processor. Upon receipt of the signal, the processor's execution switches from the current task to a task that is less compute intensive than the current one.

19 Claims, 3 Drawing Sheets

THERMOSTAT CONTROLS DSP'S TEMPERATURE BY EFFECTUATING THE DSP SWITCHING BETWEEN TASKS OF DIFFERENT COMPUTE-INTENSITY

RELATED APPLICATIONS

This application claims the benefit of U.S. Provisional Application Ser. No. 60/027,097, filed Sep. 25, 1996.

FIELD OF THE INVENTION

The invention relates to a control system to control power dissipation of a processing unit integrated in a semiconductor substrate. The system comprises at least one sensor operative to sense a temperature of the substrate. The system further has control means coupled to the sensor and operative to control operational activity of the processing unit in response to the temperature sensed.

BACKGROUND ART

The power dissipated during operational use of an electronic circuit reveals itself as heat. The heat generated by an integrated circuit typically increases with increasing transistor density and with increasing clock frequency. The eventual temperature of a semiconductor substrate in a stationary state is determined by the balance between the heat generated and the heat carried off of the substrate. A conventional way to handle excessive heat is attaching the substrate to a heat sink and/or by providing additional equipment for forced cooling such as a fan. Clearly, such measures not only are very costly, but also may preclude packaging due to the physical constraints. The use in portable equipment, e.g., in a PDA, becomes practically impossible: there is simply no room to accommodate all this equipment, the battery has very limited power and the weight would increase beyond an acceptable threshold.

Certain kinds of circuits tend to operate in bursts. That is, the circuit may, alternately, remain idle for a period of time and then operate at its maximum or near-maximum capacity for another period of time. Heat generation peaks are caused by the activity in the latter period. Because of the thermal inertia in the integrated circuit, the heat build-up and dissipation will lag behind the high-power consumption periods. That is, the heat generated during high-power operation may be carried off during those periods wherein the circuit is operating at low power.

Semiconductor packaging is designed to dissipate the amount of heat generated when the circuitry is operating at peak power. This guarantees that junction temperatures in semiconductor devices does not exceed prescribed operational limits. The semiconductor packaging cost premium due to measures required to handle peak power dissipation can be seen as wasteful. As already mentioned above, certain applications preclude special packaging due to physical constraints determined by the apparatus that is to accommodate the semiconductor device.

International Application WO92/10032 discloses a control system as specified in the preamble with multiple processor circuits that operate in a bursty fashion. In order to prevent heat damage, the known system senses the rate of change of operating temperature of the integrated processor circuits and adjusts the rate of operation of the circuits. The system includes a plurality of CMOS semiconductor chips, accommodating the processor circuits, and a sequence controller operative to supply instructions or data to the chips. Each chip is provided with a temperature sensor to generate an analog signal, indicative of the temperature sensed. In a particular embodiment, the sensor is physically integrated with the semiconductor substrate. The analog signal is supplied to a microprocessor via an A/D converter. The microprocessor serves as a PID controller and uses the received signal to calculate a quantity representative of the rate of change of the temperature. PID control allows taking into account the thermal inertia between the chip as a whole and the sensor. If the rate of change indicates that the chip's temperature will exceed a first predetermined value, no-op (no operation) instructions are supplied to the integrated circuit at a predetermined frequency. This allows the circuit to cool down. The rate of change of the temperature may indicate that the chip will reach a temperature higher than a second, higher predetermined value. In such case, additional no-op instructions are provided or the chip will be shut down completely. Alternatively, the clock frequency may be adjusted in response to the sensed rate of change of the temperature to achieve the desired cooling of the chip.

OBJECT OF THE INVENTION

It is, inter alia, an object of the invention to provide an alternative temperature control system. The alternative system interferes with the circuit's processing efficiency less severely than the system of the prior art using no-ops.

SUMMARY OF THE INVENTION

To this end, the invention provides a control system as specified in the preamble, wherein the control means is operative to effectuate switching the processing unit from a current process to another process that is less compute-intensive than the current process. The switching occurs in response to the sensor indicating the temperature having increased beyond a pre-specified threshold.

Consider, for example, a stream of video data encoded in MPEG to be processed by the processing unit. For MPEG see, e.g., "Encyclopedia of Graphics File Formats", James D.

Murray and William vanRyper; O'Reilly & Associates, Inc.; 1994; ISBN 1-56592-058-9, pp. 458–464. An MPEG data stream contains compressed video information in I-frames, P-frames and B-frames. An I-(intra-frame encoded) frame does not rely on information in another frame to be encoded or decoded. A P-(predictive encoded) frame is constructed by predicting the difference between the current frame and the nearest preceding I-frame or P-frame. A B-(bidirectional encoded) frame is constructed from the nearest previous and the nearest next I-frames or P-frames. The B-frames take care of motion compensation. Under the MPEG-standards P-frames and B-frames are not mandatory, I-frames are. When the sensor issues the indication, the control means enables switching the processing unit from its current process to a less compute-intensive process wherein one (or more) of the B-frames and/or P-frames per sequence of frames is (or are) skipped to reduce the number of decoding operations per unit time required. This may go at the expense of the quality of the decoded image, but the processing at least continues and does not stall as in the cited art above.

As another example, consider a stream of audio data to be processed by the processing unit. A certain number of computations is required per data to attain a certain signal-to-noise ratio. Performance, and therefore heat generation, is reduced by decreasing the number of operations required per data in response to the signal issued by the temperature sensor. The audio performance can be made to degrade gracefully under temperature control.

As yet another example, a procedure with energy-consuming operations, such as multiply/accumulate (MAC) cycles, is temporarily replaced by another block of code with add (or subtract) -and-shift operations, which are more economical. Again, this may go at the expense of the quality of the result.

As yet another example, consider video server applications in a multi-tasking environment, wherein one task is the energy-consuming pulling out of MPEG scenes and parallel processing thereof, and wherein another, more economical, task is backing-up or another overhead task. These are activated alternately under temperature control.

The heat flow in the systems of these examples thus is re-directed by letting the processing unit execute a code that generates less heat per unit time than the preceding code. Switching hampers the processing unit's performance considerably less severely than the no-ops of the cited prior art. The no-ops are a mere waste of processing time, as are yet other methods such as clock rate reduction or clock rate suspension.

The switching may be activated as a result of a software trap or a software interrupt. A trap is synchronous with the program run by the processing unit, in the sense that the trap is initiated by some condition caused by the running program. The sensor's output signal is, for example, a flag bit set or reset in response to the temperature sensed. An interrupt is asynchronous with the program and is usually related to I/O, that is, it is usually initiated by a condition external to the processing unit. The sensor's output signal then is handled as if it were one of the I/O signals. For more information on traps and interrupts, see any textbook on computer organization, e.g., "Structured Computer Organization", Andrew Tanenbaum, Prentice-Hall International Editions, 1976, pp. 307–312.

Another way of looking at the invention, when relating to a single processor, is to consider it as multiprogramming under temperature control. As known, multiprogramming is a technique for executing more than one program at a time in a single processor by periodically changing the program currently being executed by the processor. See, e.g., High-Performance Computer Architecture, Harold S. Stone, Addison-Wesley Publishing Company, 1987, p. 405.

DESCRIPTION OF THE DRAWING

The invention is explained below in further detail, by way of example and with reference to the accompanying drawing, wherein.

DETAILED DESCRIPTION OF THE EMBODIMENTS
FLOW DIAGRAM

Figure 1:
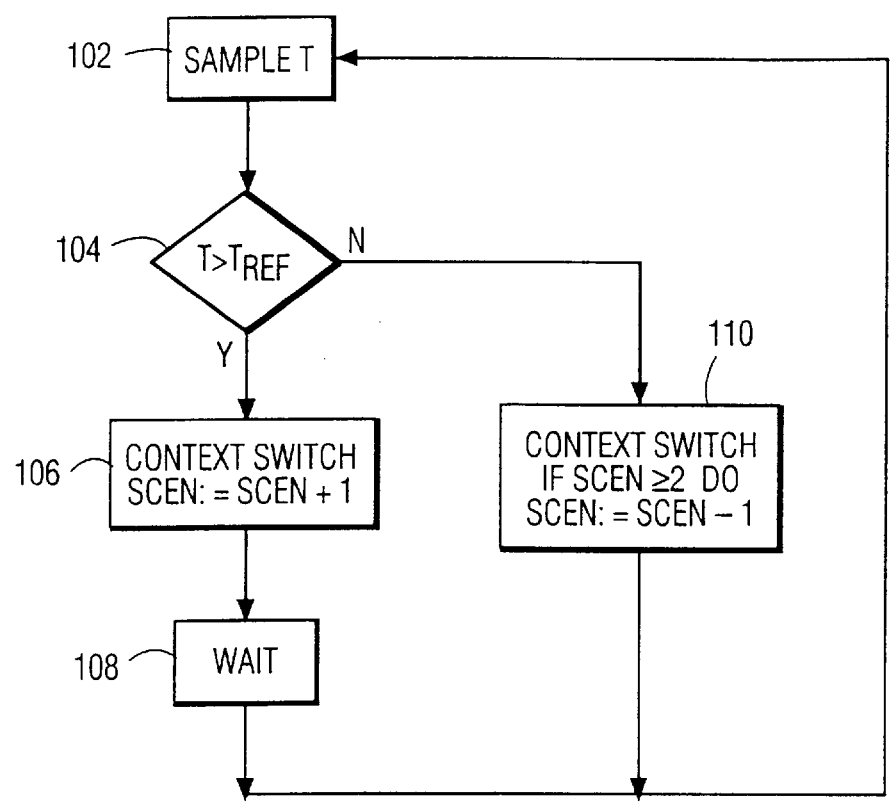
FIG. 1 is a flow diagram of a cooling procedure.

FIG. 1 is an example of a flow diagram 100 for a cooling procedure in the invention. The codes or applications to be executed are ranked in advance according to the associated levels of (expected) heat generation, e.g., in terms of numbers of operations (e.g., floating point operations) performed per input data, or in terms of numbers of input data to be handled per unit time, or the prevalent use of energy consuming operations such as multiply/accumulate (MAC) cycles. The code that is the most compute-intensive is labelled scenario SCEN:=1. Other codes are labelled SCEN:=2, SCEN:=3, and further, in the order of decreasing heat generation and power consumption. For example, SCEN:=1 includes image processing of all I-, P- and B-frames received in an MPEG format video stream, SCEN:=2 includes MPEG image processing while skipping one or more B-frames per unit time or per number of B-frames in the stream; SCEN:=3 includes MPEG image processing while skipping selected B-frames and one or more of the P-frames per unit time or per number of B-frames and P-frames; etc. The temperature T is sampled in step 102. The sampled temperature is compared to a reference temperature $T_{REF}$ in step 104. If the sampled temperature is higher than $T_{REF}$, switching is enabled in step 106 by indicating that the current scenario SCEN should be interrupted and the next scenario SCEN+1 should be initiated: SCEN:=SCEN+1. Upon a wait-time having elapsed in step 108, the temperature is sampled and compared again in order to see if the switching has resulted in a temperature decrease. If no decrease is measured, the second next scenario SCEN+2 should replace scenario SCEN+1, that is: SCEN:=SCEN+1. The ultimate scenario may include putting the processing unit on hold eventually, or lowering the clock frequency in order to get the temperature below $T_{REF}$. If the sampled temperature is not higher than $T_{REF}$, switching is enabled in step 110 to permit execution of a more compute-intensive scenario SCEN-1 if the main scenario SCEN=1 has not yet been reached: SCEN:=SCEN-1. It should be clear that the temperature control procedure discussed above is a supporting tool and that regular switching is allowed to occur under program control or under control of the I/O of the processing unit.

The context switching may occur at the lowest software level (e.g., driver or algorithm switch) or at the highest operating system level (e.g., preemptive multi-task switching), or at any level in between.

SYSTEM BLOCK DIAGRAM

Figure 2:
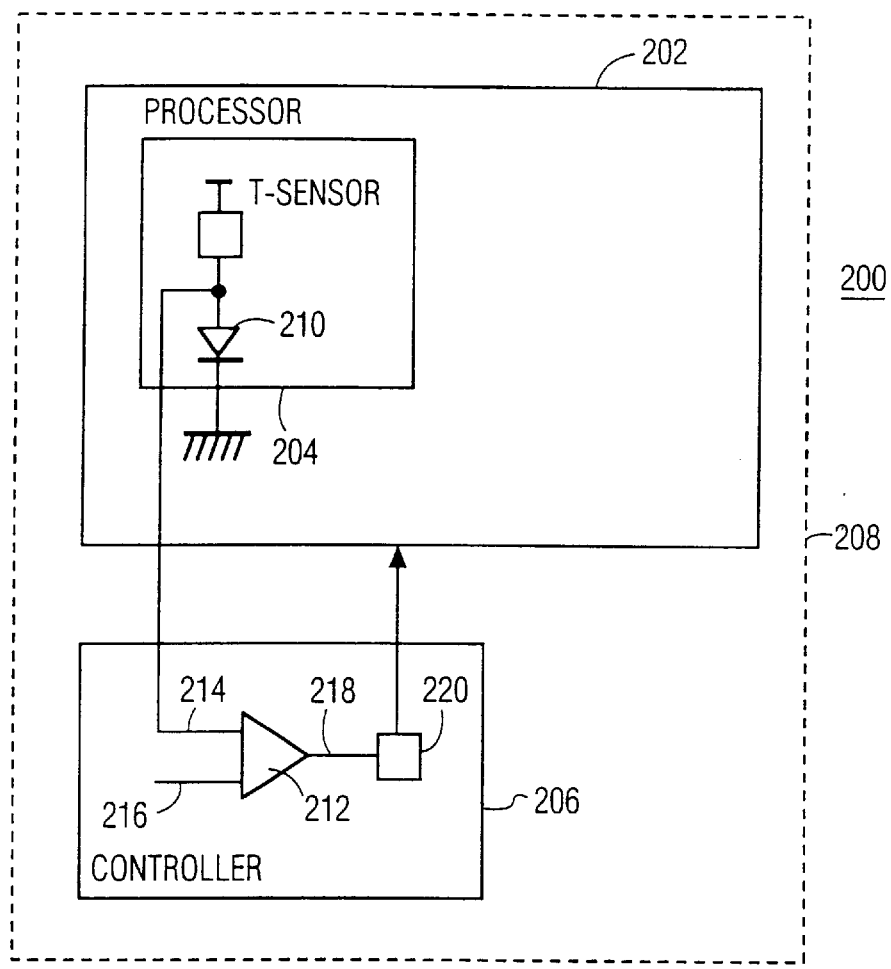
FIG. 2 is a block diagram of a system in the invention.

FIG. 2 gives a block diagram of a system 200 according to the invention, implementing the flow diagram of FIG. 1. The system comprises a data processing unit 202, a temperature sensor 204 and control means 206, all integrated in a semiconductor substrate 208. Sensor 204 provides a signal indicative of the local substrate temperature of processing unit 202 to control means 206. Control means 206 controls the operational activity of processing unit 202 in response to the temperature sensed by sensor 204. This is achieved by means of effectuating code switching in response to sensor 204 indicating the temperature having increased beyond a pre-specified threshold.

Control means 206 may be functionally merged with processing unit 202, i.e., control means 206 may be a functional part of processing unit 202, for the code switching to be initiated by a trap. Alternatively, control means 206 may serve as an I/O device to processing unit 202 and supply interrupt requests to processing unit 202.

Under some circumstances it may occur that code switching decreases heat generation by a smaller amount than no-ops in the prior art would. Accurate monitoring of the temperature is required in the invention. Sensor 204 should, therefore, be sensitive and accurate enough in the critical temperature range to allow close tracking of the temperature, preferably without any substantial thermal inertia. A way to achieve this is to physically integrate sensor 204 with substrate 208. This allows direct measurement of the local temperature of substrate 208. Preferably, sensor 204 is a functional portion of processing unit 202 itself, e.g., part of its PLL. Thus, sensor 202 provides a direct indication of the temperature at a location where it matters most, and thermal inertia effects are rendered substantially negligible. Note that the system in International Application WO92/10032 requires an extensive PID controller in order to take into account effects due to thermal inertia.

Preferably, sensor 204 and control means 206 are accommodated in the same substrate 208 as processing unit 202 in order to provide a thermally self-sufficient processing unit having a compact onboard thermostat. If the semiconductor substrate die is attached to a thermally conductive mechanical support (e.g., a heat spreader), the thermal gradient across the die is being reduced enough to only necessitate a single thermostat.

Preferably, sensor 204 is operative to provide a sensor voltage indicative of the temperature sensed, and control means 206 includes a voltage comparator 212. Comparator 212 has a first input 214 connected to sensor 210 for receipt of the sensor voltage, a second input 216 for receipt of a reference voltage and an output 218 for supply of a control signal indicative of the difference of its input voltages to effectuate the code switching. The reference voltage allows setting the switching point of comparator 212, and, therefore, to select the temperature value that triggers switching.

For the sake of completeness, reference is made to International Application WO95/25296. This prior art document discusses thermal control of a CPU, and states that it is known to have a temperature sensor connected to a comparator to issue a signal when the temperature of the CPU exceeds a threshold. The signal stops the generation of a timing signal. International Application WO95/25296 proposes as an alternative to vary the operating frequency continuously depending on the analog output provided by the temperature sensor.

THERMOSTAT CIRCUIT DIAGRAM

Figure 3:
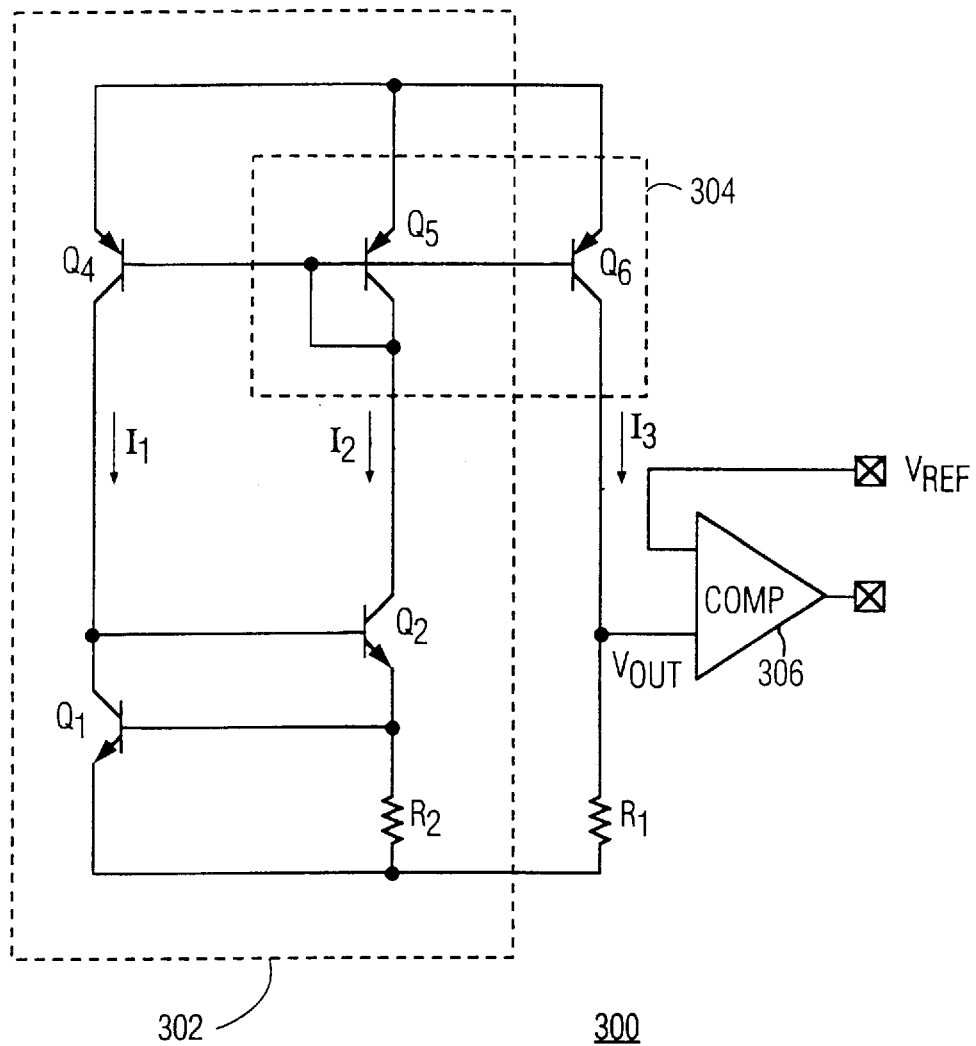
FIG. 3 is a diagram of a thermostat circuit for use in the invention.

FIG. 3 is an example of a diagram of a thermostat circuit 300 for use in the invention. Circuit 300 serves to supply an output voltage that is indicative of the substrate's temperature and that is largely independent of process parameter spread and supply voltage. This it does preferably by providing a voltage that is proportional to the absolute temperature T of substrate 208.

Circuit 300 comprises two current branches 302 and 304 in parallel between a node 306 and GND. Branch 302 comprises a series arrangement of a resistor 308 and a diode 310. Branch 304 comprises a series arrangement of a resistor 312, a resistor 314, and a parallel arrangement 316 of a number of N diodes. Typically, N=20. Node 306 is an output of a current mirror with FETs 318 and 320. A node 322 forms an input of mirror 318/320. Node 322 is connected to a current source 324. An operational amplifier 326 has an output connected to a control input of current source 324. A first input of amplifier 326 is connected to a node 328 between resistor 312 and resistor 314. A second input of amplifier 326 is connected to a node 330 between resistor 308 and diode 310. Resistors 308 and 312 are identical. The configuration of circuit 300 forms a negative feedback loop to control the currents through branches 302 and 304 as follows.

The current in branch 302 equals:

$$I_{302}=I_0\exp(qV_{be310}/kT)=I_0\exp(qV_{330}/kT), \quad (i)$$

wherein $V_{be310}$ is the junction voltage of diode 310, and wherein $V_{330}$ is the voltage at node 330.
The current in branch 304 is:

$$NI_{304}=NI_0\exp(qV_{be316}/kT), \quad (ii)$$

wherein $V_{be316}$ is the voltage drop across a single diode in parallel arrangement 316 of N diodes, and $I_{304}$ is the current through a single diode in arrangement 316. The negative feedback loop controls the currents in such a way that the voltage at node 330 equals the voltage at node 328:

$$V_{330}=V_{be316}+NI_{304}R, \quad (iii)$$

wherein R is the resistance of resistor 314. Formula (iii) translates to:

$$(kT/q)\log(I_{302}/I_0)=(kT/q)\log(I_{304}/I_0)+NI_{304}R, \quad (iv)$$

which is equivalent to:

$$(kT/q)\log(I_{302}/I_{304})=NI_{304}R \quad (v)$$

The condition that the voltage at node 330 be equal to the voltage at node 328 also translates into:

$$I_{302}R_{308}=NI_{304}R_{310} \quad (v)$$

wherein $R_{308}$ and $R_{310}$ are the resistances of resistors 308 and 310, respectively. Since $R_{308}$ equals $R_{310}$, this implies that:

$$I_{302}=NI_{304} \quad (vi)$$

Substituting (vi) into (v) gives:

$$(kT/q)\log N=NI_{304}R=I_{302}R \quad (vii)$$

or, written differently:

$$I_{302}=NI_{304}=\{(kT/q)\log N\}/R \quad (viii)$$

Formula (viii) implies that the aggregate current at output 306 of mirror 318/320 is proportional to the absolute temperature T and inversely proportional to resistance R. Mirroring out this current through additional mirror output 332 provides a current source that supplies a current $I_{Out}$ proportional to the absolute temperature T and inversely proportional to a resistance R. This current $I_{out}$ is made to flow through another resistor 334 with resistance R' made with the same IC process on the same substrate as the rest of circuit 300. A voltage $V_{336}$ created at node 336 between mirror output 332 and resistor 334 thus has a voltage proportional to the absolute temperature since the temperature dependencies and process parameter spread cancel:

$$V_{336}\propto\{(kT/q)\log N\}\{R'/R\}\propto(kT/q)\log N \quad (ix)$$

Comparing this voltage with a reference voltage $V_{ref}$, preferably externally adjustable, in a comparator 338 creates a control signal to control context switching. The signal may be obtained through a push-pull configuration (not shown) of controllable current sources that is controlled via comparator 338 to get a fast response.

Note that circuit 300 provides a signal that is proportional to the absolute temperature, and therefore needs neither calibration nor external reference components whatsoever.

I claim:

1. A control system to control power dissipation of a processing unit integrated in a semiconductor substrate, the system comprising:

at least one sensor operative to sense a temperature of the substrate; and control means coupled to the sensor and operative to control operational activity of the processing unit in response to the temperature sensed; wherein the control means is operative to effectuate switching a processing by the processing unit from a current process to another process that is less compute intensive than the current process in response to the sensor indicating the temperature having increased beyond a pre-specified threshold, without the processing unit stalling the processing of data during the substrate's cooling down.

2. The system of claim 1, wherein:

the processing unit receives a stream of input data;

the current process processes the stream of input data; and the other process skips processing of specific ones of the input data.

3. The system of claim 1, wherein:

the processing unit receives a stream of input data;

the current process performs, on the average, a first number of operations per input data; and the other process performs, on the average, a second number of operations per input data, the second number being lower than the first number.

4. The system of claim 1, wherein the control means switches among respective processes associated with respective tasks in a multi-tasking environment.

5. The system of claim 2, wherein the input data comprises at least video data or audio data.

6. The system of claim 3, wherein the input data comprises at least video data or audio data.

7. The system of claim 1, wherein the control means is operative to effectuate the context switching through a software interrupt or a software trap.

8. The system of claim 1, wherein the sensor is physically integrated in the substrate.

9. The system of claim 8, wherein the sensor is at least partly functionally integrated with the processing unit.

10. The system of claim 1, wherein:

the sensor is operative to generate a sensor voltage indicative of the temperature sensed;

the control means includes comparator means having a first input connected to the sensor for receipt of the sensor voltage, a second input for receipt of a reference voltage and an output for enabling supply of a control signal to effectuate the context switching.

11. The system of claim 10, wherein the reference voltage is programmable.

12. The system of claim 10, wherein the sensor comprises:

a current mirror having a mirror input and a mirror output;

first and second current branches connected in parallel to the mirror output, the first branch comprising:

a first series arrangement of a first resistor and a first diode;

a second series arrangement of second and third resistors and of a parallel arrangement of multiple further diodes;

an operational amplifier having a first amplifier input connected between the first resistor and the first diode, having a second input connected between the second and third resistors, and having an amplifier output;

a controllable current source connected to the mirror input and having a control input connected to the amplifier output.

13. The system of claim 1, wherein the control means is physically integrated in the substrate.

14. A method of controlling power dissipation of a processing unit integrated in a semiconductor substrate, the method comprising:

sensing a temperature of the substrate;

controlling an operational activity of the processing unit in response to the temperature sensed, wherein the controlling comprises:

effectuating switching a processing by the processing unit from a current process to another process that is less compute intensive than the current process in response to the sensor indicating the temperature having increased beyond a pre-specified threshold, without the processing unit stalling the processing of data during the substrate's cooling down.

15. The method of claim 14, wherein the processing unit receives a stream of input data and wherein the switching comprises switching from the current process that processes the stream of input data to the other process that skips processing of specific ones of the input data.

16. The method of claim 14, wherein the processing unit receives a stream of input data, wherein the current process performs, on the average, a first number of operations per input data, and wherein the switching comprises switching from the current process to the other process that performs, on the average, a second number of operations per input data, the second number being lower than the first number.

17. The method of claim 14, wherein the switching comprises switching among respective processes associated with respective tasks in a multi-tasking environment.

18. The method of claim 15, wherein the input data comprises at least video data or audio data.

19. The method of claim 16, wherein the input data comprises at least video data or audio data.

* * * * *